(12) United States Patent
Whitmer et al.

(10) Patent No.: US 7,083,143 B2
(45) Date of Patent: Aug. 1, 2006

(54) APPARATUSES AND METHODS FOR ATTACHING ENGINES AND OTHER STRUCTURES TO AIRCRAFT WINGS

(75) Inventors: Brett D. Whitmer, Everett, WA (US); Glen C. Rockwell, Seattle, WA (US); Richard B. Tanner, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/688,497

(22) Filed: Oct. 17, 2003

(65) Prior Publication Data

US 2005/0082423 A1 Apr. 21, 2005

(51) Int. Cl.
*B64D 27/00* (2006.01)
(52) U.S. Cl. ............................................. 244/54
(58) Field of Classification Search .............. 244/53 R, 244/54, 55, 53 B; 248/554; 60/796, 797
See application file for complete search history.

(56) References Cited

U.S. PATENT DOCUMENTS

| 3,327,965 | A | * | 6/1967 | Bockrath | 244/54 |
| 3,809,340 | A | * | 5/1974 | Dolgy et al. | 244/54 |
| 3,831,888 | A | * | 8/1974 | Baker et al. | 244/54 |
| 4,022,018 | A | * | 5/1977 | Tuten et al. | 60/200.1 |
| 4,065,077 | A | * | 12/1977 | Brooks | 244/54 |
| 4,266,741 | A | * | 5/1981 | Murphy | 244/54 |
| 5,320,307 | A | * | 6/1994 | Spofford et al. | 244/54 |
| 6,095,456 | A | | 8/2000 | Powell | |

* cited by examiner

*Primary Examiner*—T. Nguyen
(74) *Attorney, Agent, or Firm*—Perkins Coie LLP (57) ABSTRACT

Apparatuses and methods for attaching jet engines and other external structures to aircraft wings are disclosed herein. In one embodiment, an aircraft system includes a wing and a unitary fitting fixedly attached to the wing. The unitary fitting can include a first portion having at least a first attach feature and a second portion having at least a second attach feature. The aircraft system can further include an engine or other external structure positioned proximate to the wing and coupled to the unitary fitting. The unitary fitting can be configured to transfer at least approximately all of the flight loads from the external structure to the wing.

24 Claims, 6 Drawing Sheets

APPARATUSES AND METHODS FOR ATTACHING ENGINES AND OTHER STRUCTURES TO AIRCRAFT WINGS

TECHNICAL FIELD

The following disclosure relates generally to aircraft structures and, more particularly, to aircraft structures for attaching engines and other objects to aircraft wings.

BACKGROUND

Figure 1:
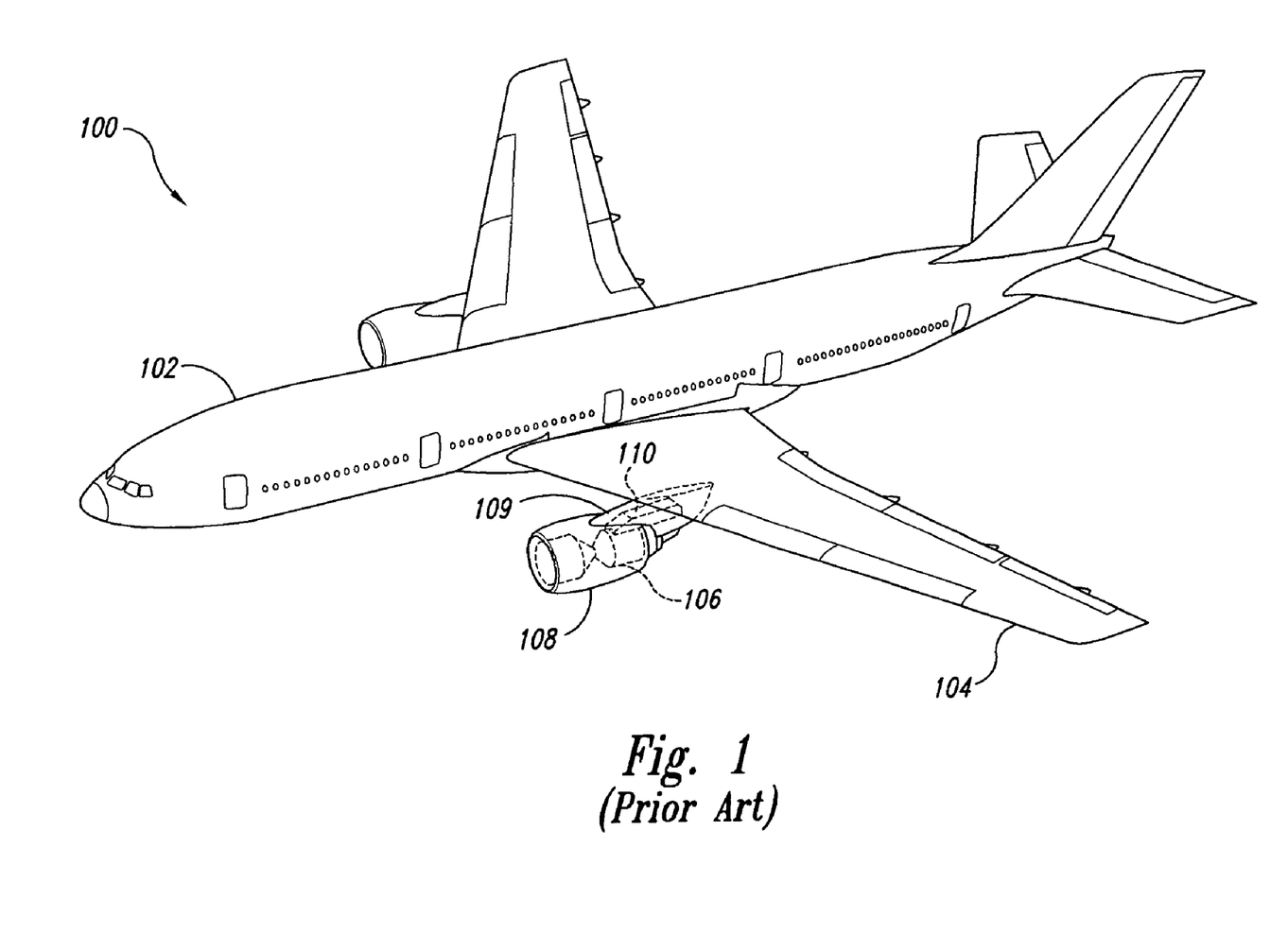
FIG. 1 is a schematic, top isometric view of an aircraft with a wing-mounted engine configured in accordance with the prior art.

Many conventional transport aircraft have wing-mounted engines. One such aircraft is illustrated in FIG. 1, which shows a schematic, top isometric view of a conventional jet transport aircraft 100 with a wing-mounted engine 106. The aircraft 100 includes a fuselage 102 and a wing 104 extending outwardly from the fuselage 102. The engine 106 is housed in a nacelle 108 and is structurally attached to the wing 104 with an engine pylon or engine strut 110 (shown schematically). An aerodynamic fairing 109 extends between the wing 104 and the nacelle 108 and encloses the engine strut 110.

Figure 2:
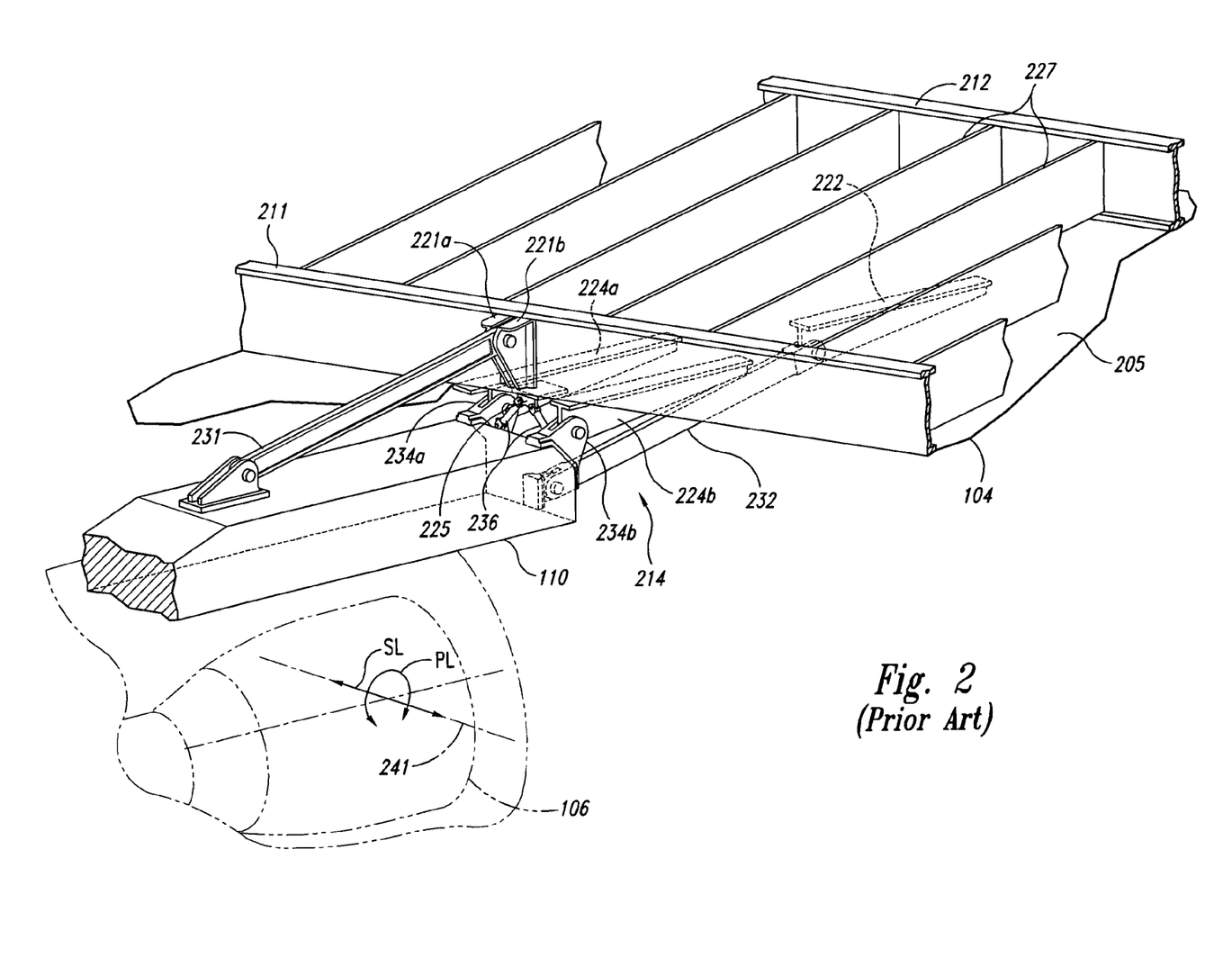
FIG. 2 is an enlarged, cutaway isometric view of a portion of a wing of the aircraft of FIG. 1, illustrating an engine support system configured in accordance with the prior art.

FIG. 2 is an enlarged, cutaway isometric view of a portion of the wing 104 of FIG. 1. The fairing 109 (FIG. 1) has been omitted from FIG. 2 for purposes of illustrating certain aspects of an engine support system 214 configured in accordance with the prior art. The support system 214 includes an inboard pitch load fitting 221a and an outboard pitch load fitting 221b fixedly attached to a front spar 211 of the wing 104 in a side-by-side clevis-type arrangement. The support system 214 further includes an inboard side load fitting 224a, an outboard side load fitting 224b, a center side load fitting 225, and a lower pitch load fitting 222. The side load fittings 224 are spaced apart from each other and fixedly attached to the front spar 211 and a lower wing skin portion 205 extending between the front spar 211 and a rear spar 212. The center side load fitting 225 is fixedly attached to the front spar 211 between the two side load fittings 224. The lower pitch load fitting 222 is positioned on the lower wing skin portion 205 aft of the center side load fitting 225 and is fixedly attached to at least one wing rib 227 extending between the front spar 211 and the rear spar 212.

An inboard side load clevis 234a and an outboard side load clevis 234b pivotally connect an aft portion of the engine strut 110 (shown schematically) to the inboard side load fitting 224a and the outboard side load fitting 224b, respectively. Additionally, two side load links 236 extend between the aft portion of the engine strut 110 and the center side load fitting 225. An upper pitch strut 231 extends forward from the pitch load fittings 221 and is coupled to a forward portion of the engine strut 110. A lower pitch strut 232 similarly extends forward from the lower pitch load fitting 222 and is coupled to a lower-aft portion of the engine strut 110.

The engine 106 transmits primary structural loads in flight as a result of its weight and propulsive capability. These primary loads can include pitch loads PL acting about a lateral axis 241, and side loads SL acting along the lateral axis 241. In general, the pitch loads PL are transferred to the wing 104 by the combination of the upper pitch strut 231 and the lower pitch strut 232. The side loads SL from the engine 106 are typically transferred to the wing 104 by the side load fittings 224 and the center side load fitting 225. The two pitch struts 231, 232 together with the two side load fittings 224 provide a measure of redundancy; if one of the two pitch struts or a related joint fails, the other pitch strut can adequately carry the pitch load PL from the engine 106 to the wing 104.

Manufacturing the prior art engine support system 214 described above can be a time consuming and costly process. Each of the separate load fittings (i.e., the pitch load fittings 221, 222; the side load fittings 224; and the center side load fitting 225) must be precisely located relative to the others to accommodate interchangeability between different engine struts as engines are changed-out for servicing, etc. A typical method for locating these fittings with sufficient accuracy involves positioning the bare fittings on the wing 104 with an elaborate tooling fixture during build-up of the wing. After the fittings are fixed in position, the various attach points are align-bored to ensure adequate alignment. Bearings are then installed into each of the finished bores. Not only is the tooling for these operations expensive, but the additional time required to install these fittings can add significant cost to the manufacturing process of the wing.

SUMMARY

The present invention is directed generally toward apparatuses and methods for attaching engines and other structures to aircraft wings. An aircraft system configured in accordance with one aspect of the invention can include a wing having a front spar and a rear spar forming a wing box. In this embodiment, the aircraft system can further include a unitary fitting fixedly attached at least proximate to the wing box, and a jet engine positioned proximate to the wing and structurally coupled to the unitary fitting. In flight, the unitary fitting transfers at least approximately all of the primary loads from the jet engine to the wing box.

The primary loads transmitted by the jet engine can include pitch loads and side loads. In another aspect of the invention, the unitary fitting can include a first portion having a first attach feature and a second portion having a second attach feature spaced apart from the first attach feature. The first attach feature can be coupled to the jet engine and configured to transfer at least a portion of the pitch loads from the jet engine to the wing box. The second attach feature can also be coupled to the jet engine and configured to transfer at least a portion of the side loads from the jet engine to the wing box.

A method for attaching a propulsive engine to an aircraft wing in accordance with a further aspect of the invention includes attaching a unitary fitting to the aircraft wing. The method can further include attaching the engine to an engine support structure and structurally coupling the engine support structure to the unitary fitting. The unitary fitting can be configured to transfer at least approximately all of the primary loads from the engine to the aircraft wing.

DETAILED DESCRIPTION

The following disclosure describes apparatuses and methods for attaching engines and other objects to aircraft wings. Certain details are set forth in the following description and in FIGS. 3A–5 to provide a thorough understanding of various embodiments of the invention. Other details describing well-known structures and systems often associated with aircraft and/or wing-mounted engine systems are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, and features without departing from the spirit or scope of the present invention. In addition, further embodiments of the invention may be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 320 is first introduced and discussed with reference to FIG. 3A.

Figure 3A:
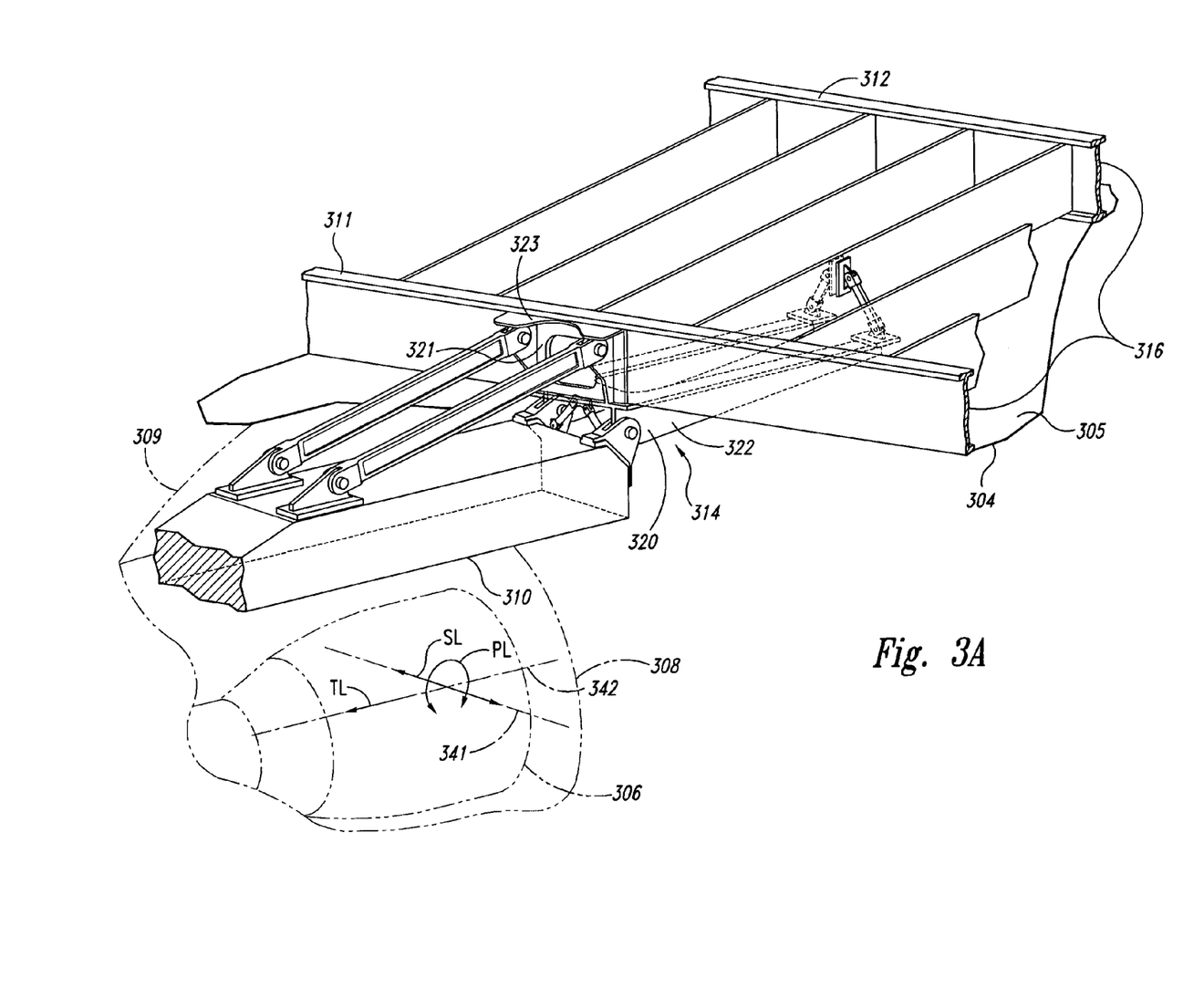
FIG. 3A is a partially schematic, cutaway isometric view of a portion of an aircraft wing illustrating an engine support system configured in accordance with an embodiment of the present invention.

FIG. 3A is a partially schematic, cutaway isometric view of a portion of an aircraft wing 304 illustrating an engine support system 314 configured in accordance with an embodiment of the invention. In one aspect of this embodiment, the engine support system 314 includes an engine pylon or engine strut 310 (shown schematically) structurally coupled to a unitary engine strut support fitting 320 ("support fitting 320"). The engine strut 310 supports an engine 306, such as a turbofan engine, positioned below the wing 304 and housed in a nacelle 308. A fairing 309 extends between the nacelle 308 and the wing 304 and encloses the engine strut 310. In another aspect of this embodiment, at least approximately all of the primary loads from the engine 306 are transferred to the wing 304 through the support fitting 320. These primary loads can include pitch loads PL acting about a lateral axis 341, side loads SL acting along the lateral axis 341, and thrust loads TL acting along a longitudinal axis 342. These primary loads can also include various loading conditions imposed by regulatory agencies.

Figure 3B:
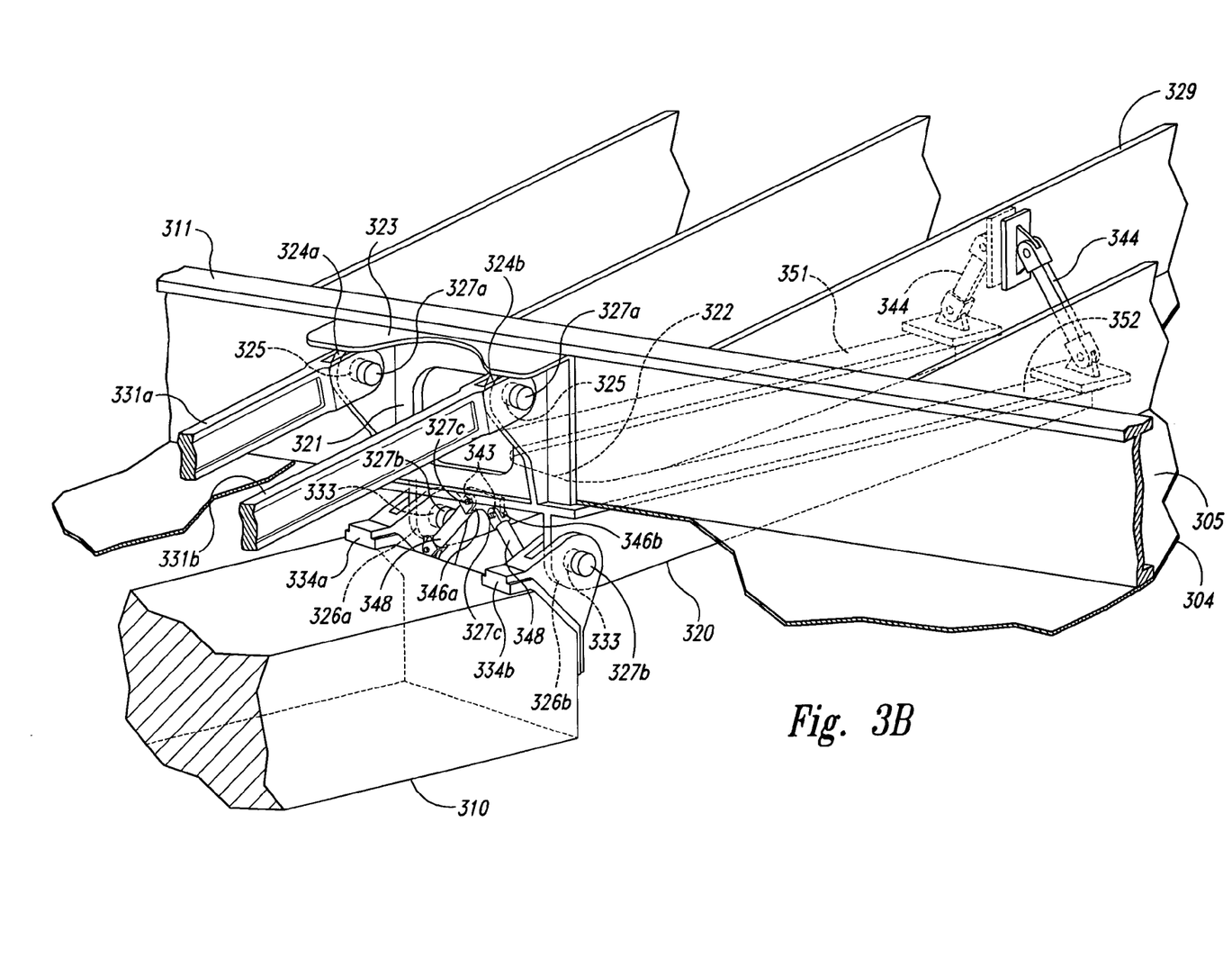
FIG. 3B is an enlarged isometric view of the engine support system shown in FIG. 3A.

FIG. 3B is an enlarged isometric view of the engine support system 314 shown in FIG. 3A. In one aspect of this embodiment, the support fitting 320 includes a unitary body 323 having a first portion 321 and a second portion 322. The first portion 321 can be fixedly attached to a front spar 311 of the wing 304. The second portion 322 can extend below and aft of the first portion 321 and can include an inboard portion 351 and an outboard portion 352. The second portion 322 can be fixedly attached to a lower portion of the front spar 311 and to a lower wing skin portion 305 extending between the front spar 311 and a rear spar 312 (FIG. 3A).

In another aspect of this embodiment, the first portion 321 of the unitary body 323 includes at least a first attach feature 324a, and the second portion 322 includes at least a second attach feature 326a spaced apart from the first attach feature 324a. In the illustrated embodiment, the first portion 321 further includes a third attach feature 324b spaced apart from the first attach feature 324a, and the second portion 322 further includes a fourth attach feature 326b spaced apart from the second attach feature 326a. Each of the attach features 324 can include a pin bore 325. Each of the pin bores 325 can be configured to receive a structural attach pin, such as a first fuse pin 327a, for coupling a corresponding pitch strut 331 (identified individually as a first pitch strut 331a and second pitch strut 331b) to the support fitting 320. The pitch struts 331 extend at least generally forward from the support fitting 320 and are structurally attached to a forward portion of the engine strut 310 (FIG. 3A).

In a further aspect of this embodiment, the two pitch struts 331 transfer at least a portion of the pitch loads PL from the engine 306 to a wing box 316 (FIG. 3A). The wing box 316 includes the front spar 311, the rear spar 312, and the wing skin portion 305. One advantage of this configuration over the prior art engine support system 214 described above with reference to FIG. 2 is that the two pitch struts 331 provide a measure of redundancy. As a result, the lower pitch strut 232 and the lower pitch load fitting 222 of the prior art system 214 (FIG. 2) can be eliminated. Eliminating the lower pitch strut 232 provides the additional benefit of allowing the fairing 109 (FIG. 1) to be shorter, thereby reducing cost, weight, and drag.

In yet another aspect of this embodiment, each of the attach features 326 includes a pin bore 333. Each of the pin bores 333 can be configured to receive a structural attach pin, such as a second fuse pin 327b, for coupling a corresponding side load fitting 334 (identified individually as a first side load fitting 334a and a second side load fitting 334b) to the support fitting 320. The side load fittings 334 are fixedly attached to an aft portion of the engine strut 310. In this embodiment, the second attach feature 326a and the fourth attach feature 326b can transfer the thrust loads TL and at least a portion of the side loads SL from the engine 306 to the wing box 316 (FIG. 3A).

In a further aspect of this embodiment, the unitary body 323 also includes a fifth attach feature 346a and a sixth attach feature 346b positioned between the second attach feature 326a and the fourth attach feature 326b. In the illustrated embodiment, each of the attach features 346 includes a pin bore 343. Each of the pin bores 343 can be configured to receive a structural attach pin, such as a third fuse pin 327c, for coupling a corresponding side load link 348 to the support fitting 320. The side load links 348 are pivotally attached to the aft portion of the engine strut 310 and can transfer at least a portion of the side loads SL from the engine 306 to the wing box 316 (FIG. 3A). In addition to the foregoing structural members, in another aspect of this embodiment, one or more wing ribs 329 can be utilized to carry out-of-plane or kick loads from the support fitting 320. For example, in the illustrated embodiment, the engine support system 314 can further include a pair of kick struts 344 extending between distal ends of the second portion 322 and the adjacent wing rib 329. In other embodiments, kick loads can be transferred from the support fitting 320 to one or more of the wing ribs 329 in other ways.

In the foregoing embodiments, the unitary body 323 is manufactured from a single or integral piece of material. In other embodiments, however, the unitary body 323 can be manufactured from separate pieces of material that are fixed together into a single unit. For example, in one such embodiment, the unitary body 323 can be manufactured from two separate parts that are fixed together before installation on an aircraft wing. Thus, the term "unitary," as used herein, refers to a structure that is either fabricated from a single piece of material or fabricated from two or more pieces of material that are fixed together as a unit before subsequent installation on an aircraft wing.

The particular configuration of the support fitting 320 illustrated in FIGS. 3A and 3B represents one embodiment of a unitary support fitting configured in accordance with the present invention for transferring at least approximately all of the primary loads from an engine to a wing box. In other embodiments, other such fittings can have other configurations without departing from the spirit or scope of the present invention. For example, in other embodiments, unitary support fittings may include more or fewer attach features than those illustrated in FIGS. 3A, B. In further embodiments, the general arrangement or the particular design of the various attach features may differ from that illustrated in FIGS. 3A, B.

Further, although the embodiment illustrated in FIGS. 3A, B depicts a wing-mounted engine 306, in other embodiments, aspects of the support system 314 can be utilized to attach other objects to an aircraft wing. For example, in one other embodiment, a support system at least generally similar to the support system 314 can be used to attach an external fuel tank to an aircraft wing. In yet another embodiment, such a support system can be used to attach an external cargo container to a wing. In a further embodiment, a support system utilizing a unitary support fitting in accordance with the present invention can be used to attach a weapons system to an aircraft wing. The foregoing list is not exhaustive. Accordingly, in other embodiments, a support system configured in accordance with aspects of the present invention can be used to attach yet other objects to an aircraft wing.

One feature of aspects of the invention described above with reference to FIGS. 3A and 3B is that all of the primary structural attach points for the engine strut 310 reside on a unitary fitting, namely, the support fitting 320. One advantage of this feature is that each of the pin bores 325, 333, 343 at the attach points can be precisely located relative to each other "off-line" during the detail manufacturing of the support fitting 320, instead of during the critical build-up of the wing 304. Moving this task off-line can greatly reduce the cost and time required to manufacture the wing 304. In addition, this feature eliminates the complex tooling required to align-bore pin bores in situ on a wing assembly. Instead, only a simple holding fixture is required to install a support fitting 320 on the wing 304.

Figure 4:
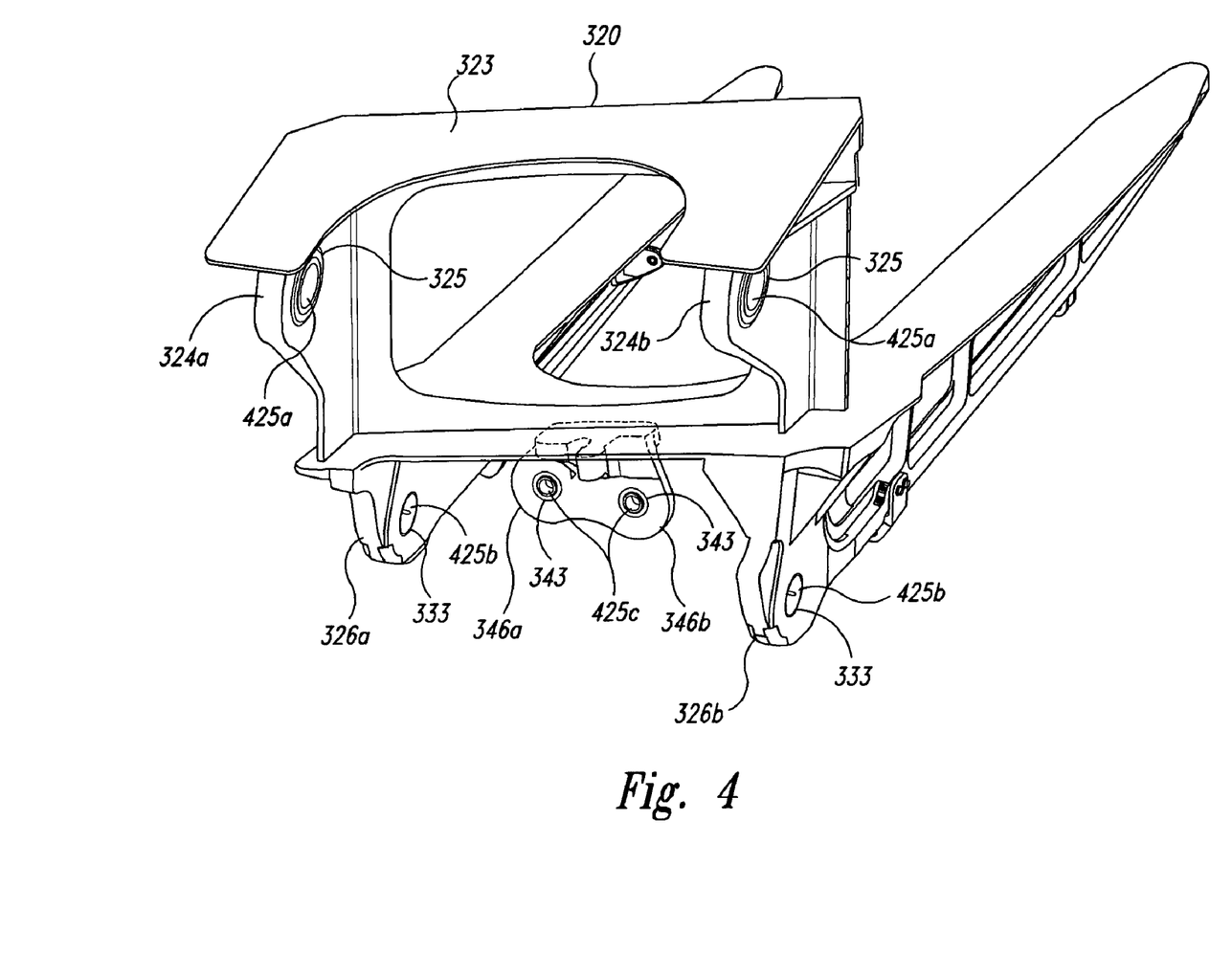
FIG. 4 is an enlarged isometric view of a unitary engine strut support fitting configured in accordance with an embodiment of the invention.

FIG. 4 is an enlarged isometric view of the support fitting 320 of FIGS. 3A and 3B configured in accordance with an embodiment of the invention. In one aspect of this embodiment, each of the pin bores 325 extending through the attach features 324 is configured to receive a first bearing 425*a*, such as a spherical bearing. Similarly, each of the pin bores 333 extending through the attach features 326 is configured to receive a second bearing 425*b*, and each of the pin bores 343 extending through the attach features 346 is configured to receive a third bearing 425*c*. The bearings 425 can include alignment features that facilitate installation of the corresponding fuse pins 327 (FIG. 3B). In addition, the bearings 425 can also facilitate distribution of bearing loads from the fuse pins 327 to the corresponding attachment features of the support fitting 320.

In another aspect of this embodiment, the unitary body 323 of the support fitting 320 can be machined from a metal casting. For example, in one embodiment, the unitary body 323 can be machined from a titanium casting, such as a Ti-6A1-4V HIP casting. One advantage of using a casting is that the machining required to finish the unitary body 323 is minimized because the majority of the exterior surfaces of the unitary body 323 remain in the "as cast" condition. In other embodiments, the unitary body 323 can be manufactured from various other materials suitable for aircraft applications. For example, in one other embodiment, the unitary body 323 can be machined from aluminum. In a further embodiment, it is expected that the unitary body 323 can be manufactured from a composite material, such as carbon fiber. In yet other embodiments, the unitary body 323 can be manufactured from other materials using other manufacturing processes.

Regardless of the type of material used to manufacture the unitary body 323, the unitary body 323 can be configured in such a way as to minimize the likelihood of a structural failure of one of the attach features (i.e., 324, 326, and 346) causing a structural failure of another attach feature. For example, in one embodiment, the unitary body 323 can include features to minimize or eliminate crack or fracture propagation from one attach feature to another. There are various known methods for arresting crack propagation in unitized fittings that can be employed in this context. One such method is to provide undercut portions or holes adjacent to each of the various attach features that are designed to terminate the crack and limit the structural failure to the one corresponding attach feature. In other embodiments, other suitable methods can be employed to prevent propagation of a structural failure.

Figure 5:
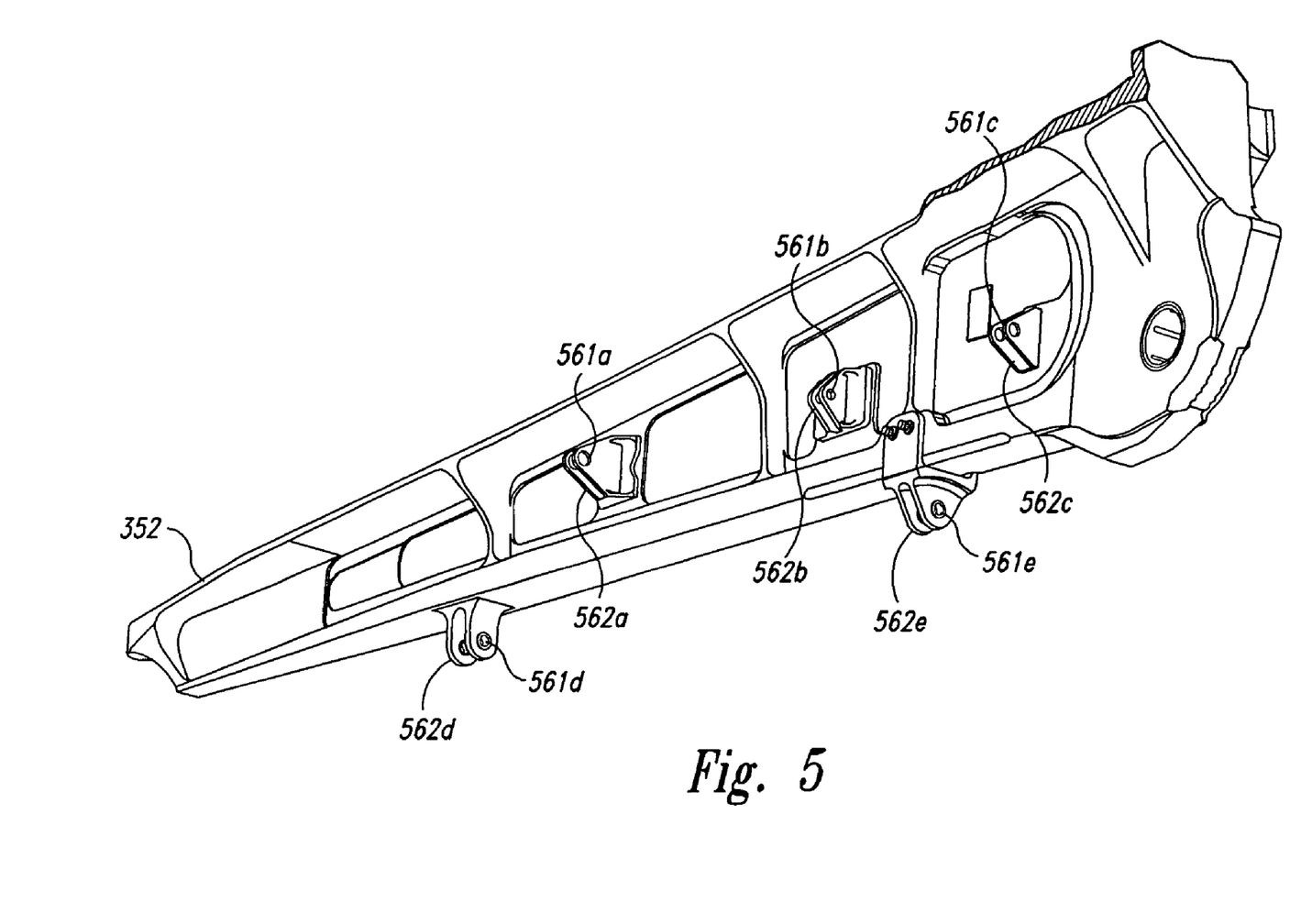
FIG. 5 is an enlarged, bottom isometric view of a portion of the engine strut support fitting of FIG. 4, illustrating a plurality of secondary pin bores configured in accordance with an embodiment of the invention.

FIG. 5 is an enlarged, bottom isometric view of the outboard portion 352 of the support fitting 320 (FIG. 3B) configured in accordance with an embodiment of the invention. In one aspect of this embodiment, the outboard portion 352 includes a plurality of secondary pin bores 561 (identified individually as pin bores 561*a*–561*e*). In the illustrated embodiment, the secondary pin bores 561 are formed in corresponding clevice portions 562 (identified individually as clevice portions 562*a*–562*e*). In one embodiment, the clevice portions 562 can be machined directly from the casting that forms the unitary body 323 (FIG. 4). In another embodiment, one or more of the device portions 562 can be formed separately and then fixedly attached to the outboard portion 352.

In another aspect of this embodiment, the secondary pin bores 561 can be utilized to attach secondary structures to the wing 304 (FIG. 3A). In one embodiment, such secondary structures can include the fairing 309 extending between the nacelle 308 and the wing 304. In another embodiment, such secondary structures can include support structures for various aircraft systems, such as hydraulic and/or electrical systems associated with the engine 306. One feature of aspects of the invention illustrated in FIG. 5 is that the secondary pin bores 561 can be precisely located relative to each other during the detail manufacturing of the support fitting 320, rather than during build-up of the wing 304. As mentioned above, providing secondary pin bores in this manner can greatly reduce the time and cost associated with the build-up of a wing.

From the foregoing, it will be appreciated that specific embodiments of the invention have been described herein for purposes of illustration, but that various modifications may be made without deviating from the spirit and scope of the invention. Accordingly, the invention is not limited, except as by the appended claims.

The invention claimed is:

1. An aircraft system comprising:
   a wing;
   an external structure positioned proximate to the wing; and
   a unitary fitting attached to the wing to transfer at least approximately all of the primary loads from the external structure to the wing, the primary loads including pitch loads and side loads, the unitary fitting including a first portion and a second portion, the first portion having at least a first attach feature and the second portion having at least a second attach feature spaced apart from the first attach feature, wherein the first attach feature transfers at least a portion of the pitch loads from the external structure to the wing, and the second attach feature transfers at least a portion of the side loads from the external structure to the wing.

2. The aircraft system of claim 1 wherein the wing includes a front spar, and wherein the first and second portions of the unitary fitting are fixedly attached at least proximate to the front spar.

3. The aircraft system of claim 1 wherein the wing includes a front spar and a wing skin portion extending aft from the front spar, wherein the first portion of the unitary fitting is fixedly attached at least proximate to the front spar, and wherein the second portion of the unitary fitting is fixedly attached at least proximate to the wing skin portion.

4. The aircraft system of claim 1 wherein the first portion of the unitary fitting further includes a third attach feature spaced apart from the first attach feature and coupled to the external structure, and wherein the third attach feature transfers at least a portion of the pitch loads from the external structure to the wing.

5. The aircraft system of claim 1 wherein the first portion of the unitary fitting further includes a third attach feature spaced apart from the first attach feature, wherein the first attach feature includes a first bore coupled to the external structure and the third attach feature includes a second bore coupled to the external structure, and wherein the second portion of the unitary fitting further includes a fourth attach feature spaced apart from the second attach feature, wherein the second attach feature includes a third bore coupled to the external structure and the fourth attach feature includes a fourth bore coupled to the external structure.

6. The aircraft system of claim 5 wherein the third and fourth bores are at least generally aligned along a common axis.

7. The aircraft system of claim 1 wherein the first portion of the unitary fitting further includes a third attach feature spaced apart from the first attach feature, wherein the first attach feature includes a first bore coupled to the external structure and the third attach feature includes a second bore coupled to the external structure, and wherein the second portion of the unitary fitting further includes a fourth attach feature spaced apart from the second attach feature, wherein the second attach feature includes a third bore coupled to the external structure and the fourth attach feature includes a fourth bore coupled to the external structure, further wherein the first, second, third and fourth bores are at least generally parallel.

8. The aircraft system of claim 1 wherein the external structure includes a propulsive engine.

9. The aircraft system of claim 1 wherein the external structure includes a turbo-fan engine.

10. The aircraft system of claim 1 wherein the external structure includes a fuel tank.

11. The aircraft system of claim 1 wherein the external structure includes a weapons system.

12. The aircraft system of claim 1 wherein the external structure includes a cargo hold.

13. The aircraft system of claim 1, further comprising a fuselage, wherein the wing extends outwardly from the fuselage.

14. A fitting for attaching an external structure to a wing, the external structure transmitting primary loads in flight including pitch loads and side loads, the fitting including:
   a unitary body that transfers at least approximately all of the primary loads from the external structure to the wing, the unitary body having:
   a first portion attached to the wing, the first portion having a first attach feature coupled to the external structure to transfer at least a portion of the pitch loads from the external structure to the wing; and
   a second portion having a second attach feature spaced apart from the first attach feature and coupled to the external structure, wherein the second attach feature transfers at least a portion of the side loads from the external structure to the wing.

15. The fitting of claim 14 wherein the wing includes a front spar, a rear spar, and a wing skin portion extending between the front spar and the rear spar, and wherein the first portion of the fitting is attached to the front spar and the second portion of the fitting is at least partially attached to the wing skin portion.

16. The fitting of claim 14 wherein the unitary body is formed from a single piece of metal.

17. The fitting of claim 14 wherein the unitary body is formed by fixedly attaching a first body portion to at least a second body portion.

18. The fitting of claim 14 wherein the first portion of the unitary body further includes a third attach feature coupled to the external structure, and the second portion of the unitary body further includes a fourth attach feature coupled to the external structure, wherein the first attach feature includes a first bore and the third attach feature includes a second bore spaced apart from the first bore, the first and second bores being at least generally parallel, and wherein the second attach feature includes a third bore and the fourth attach feature includes a fourth bore spaced apart from the third bore, the third and fourth bores being at least generally parallel.

19. The fitting of claim 14 wherein the unitary body includes at least one crack inhibiting mechanism positioned adjacent to at least one of the first and second attach features, wherein the crack inhibiting mechanism is configured to arrest crack propagation from proximate to one of the first and second attach features to proximate the other one of the first and second attach features.

20. The aircraft system of claim 1 wherein the first portion of the unitary fitting further includes a third attach feature spaced apart from the first attach feature, and wherein the aircraft system further comprises:
   a first structural member extending between the external structure and the first attach feature; and
   a second structural member spaced apart from the first structural member and extending between the external structure and the third attach feature, wherein the third attach feature transfers at least a portion of the pitch loads from the external structure to the wing.

21. The aircraft system of claim 1 wherein the first portion of the unitary fitting further includes a third attach feature spaced apart from the first attach feature, and wherein the aircraft system further comprises:

a first pitch strut extending between the external structure and the first attach feature; and a second pitch strut positioned parallel to the first pitch strut and extending between the external structure and the third attach feature, wherein the third attach feature transfers at least a portion of the pitch loads from the external structure to the wing.

22. The aircraft system of claim 1:

wherein the first portion of the unitary fitting further includes a third attach feature spaced apart from the first attach feature, wherein the first attach feature includes a first bore coupled to the external structure by a first pin, and wherein the third attach feature includes a second bore coupled to the external structure by a second pin; and wherein the second portion of the unitary fitting further includes a fourth attach feature spaced apart from the second attach feature, wherein the second attach feature includes a third bore coupled to the external structure by a third pin, and wherein the fourth attach feature includes a fourth bore coupled to the external structure by a fourth pin.

23. The fitting of claim 14 wherein the first attach feature is attached to a first structural member extending between the first attach feature and the external structure, and wherein the first portion of the unitary body further includes a third attach feature attached to a second structural member extending between the third attach feature and the external structure.

24. The fitting of claim 14 wherein the first attach feature is attached to a first pitch strut by a first pin, and wherein the first portion of the unitary body further includes a third attach feature attached to a second pitch strut by a second pin, wherein the first and second pitch struts extend between the external structure and the first portion of the unitary body.

* * * * *

UNITED STATES PATENT AND TRADEMARK OFFICE
CERTIFICATE OF CORRECTION

| | |
|---|---|
| PATENT NO. | : 7,083,143 B2 |
| APPLICATION NO. | : 10/688497 |
| DATED | : August 1, 2006 |
| INVENTOR(S) | : Whitmer et al. |

It is certified that error appears in the above-identified patent and that said Letters Patent is hereby corrected as shown below:

<u>Column 6</u>
Line 44, "device" should be --clevice--;

Signed and Sealed this

Twelfth Day of December, 2006

JON W. DUDAS
*Director of the United States Patent and Trademark Office*